United States Patent [19]
Horski et al.

[11] Patent Number: 5,734,219
[45] Date of Patent: Mar. 31, 1998

[54] SLIDING BRUSH SYSTEM WITH SHAPE MEMORY ALLOY ELEMENT FOR TWO-SPEED DIRECT CURRENT MOTOR

[75] Inventors: Marek Horski; Andrew Lakerdas, both of London, Canada

[73] Assignee: Siemens Electric Limited, Mississauga, Canada

[21] Appl. No.: 668,019

[22] Filed: Jun. 17, 1996

[51] Int. Cl.$^6$ .................................................... H02K 5/14
[52] U.S. Cl. .................... 310/240; 310/238; 310/239; 310/240; 310/242; 310/245; 310/148
[58] Field of Search .................................. 310/249, 238, 310/239, 240, 243, 245, 241, 242, 148

[56] References Cited

U.S. PATENT DOCUMENTS

| | | | |
|---|---|---|---|
| 2,381,982 | 8/1945 | Nardone | 171/324 |
| 4,658,321 | 4/1987 | Lindner | 361/25 |
| 4,823,035 | 4/1989 | Kudla et al. | 310/68 C |
| 5,311,615 | 5/1994 | Couetoux | 388/836 |

FOREIGN PATENT DOCUMENTS

| | | | |
|---|---|---|---|
| 138298 | 7/1985 | Japan | 310/249 |
| 296746 | 12/1987 | Japan | 310/245 |
| 177282 | 7/1990 | Japan | 310/240 |
| 300705 | 11/1993 | Japan | 310/249 |

Primary Examiner—Clayton E. LaBalle
Assistant Examiner—Karl I. Eizo Tamai

[57] ABSTRACT

A brush system for providing an electric connection to a rotating commutator wheel of an electric machine is disclosed. The brush system has a switched brush selectively switchable between an engaged position and a disengaged position and a switch connected to the switched brush and formed of a shape-memory-alloy. The switch attains an extended state at a first temperature and attaining a retracted state at a second temperature, for switching the switched brush alternately to the respective engaged position and the respective disengaged position. The switch includes a temperature conditioner for varying a temperature at the switch between the first temperature and the second temperature. The temperature condition may be an electric network wherein the internal resistance of the switch allows for heating of the switch to the second temperature.

25 Claims, 2 Drawing Sheets

5,734,219

SLIDING BRUSH SYSTEM WITH SHAPE MEMORY ALLOY ELEMENT FOR TWO-SPEED DIRECT CURRENT MOTOR

FIELD OF THE INVENTION

The present invention relates to a sliding brush system for a two-speed direct current motor. In particular, the present invention relates to a sliding brush system for a two-speed motor that uses a shape memory alloy to retract a brush from contact with the surface of the commutator when the brush is not electrically active.

BACKGROUND OF THE INVENTION

A brush system is an important component for an electric machine of one of certain types, particularly a direct current (DC) motor, having a rotating major component (generally called a rotor) and a stationary major component (generally called stator). A large field of application for such DC motors is the automotive industry, which applies such motors to drives various systems and auxiliaries in vehicles.

For certain applications, it is desired to operate a DC motor selectively at multiple rotational speeds. This can be accomplished in a manner known in the art by suitably designing electrically active parts of the rotor (including the electric winding and the commutator wheel) and providing a plurality of brushes to feed electric current into winding of the rotor, with respective pairs of brushes having at least two mutually different angular relationships with each other. For two-speed operation, three brushes will be provided in general. One of these will always be operated and the speed selection be done by selectively operating one or the other of the remaining two brushes. Thereby, feeding the electric current to the rotor is possible in at least two ways, whereby two-speed operation is achieved.

Two-speed operation is a common feature of electric motors for automotive applications. Two-speed operation is made possible by adding a winding, set of brushes and commutator to the motor. Two-speed operation is accomplished by energizing either the main (primary) set of brushes or the secondary brush set (thereby energizing the primary set of brushes or secondary winding) to achieve either a low speed or high speed Both brushes are in contact with the commutator at all times during motor operation regardless of whether the motor is operating at low speed or high speed.

In known motors of this type, it is common to leave all brushes (including every brush not currently operated) in contact with the rotating commutator wheel during operation at any speed. While this may simplify motor construction, the one (or more) inactive brush contacting the commutator wheel is likely to increase the noise level of the motor, causes the motor to operate less efficiently due to commutation losses, and causes premature brush wear.

Motor designs intended to remove brushes not currently used from contact with the commutator wheel are known in the art. However, such designs typically consist of a relatively complex apparatus to accomplish the necessary movements of the brushes not to be used, and accordingly have not been widely accepted (at least not in connection with the automotive industry due to considerations of additional costs to be required as well as additional space to be provided).

Accordingly, it would be advantageous to provide a brush system for an electric machine wherein any brush which is not in use from the commutator surface is retracted. It would be advantageous to provide a compact arrangement for a brush system in an electric machine whereby efficiency noise level can be increased and can be reduced and brush life can be extended by providing for the retraction of a brush not in use from the commutator wheel by energizing a shape memory alloy element which slides and lifts the brush away from the commutator surface. It would further be advantageous to provide a relatively inexpensive brush system suitable for the constraints of the automobile industry employing the shape memory alloy element to reduce commutation losses in the machine.

SUMMARY OF THE INVENTION

The present invention relates to a brush system for providing an electric connection to a rotating commutator wheel of an electric machine. The brush system includes a switched brush selectively switchable between an engaged position and a disengaged position, and a switch connected to the switched brush and formed of a shape-memory-alloy. The switch attains an extended state at a first temperature and a retracted state at a second temperature, thereby switching the switched brush alternately to the engaged position and the disengaged position. The switch includes a temperature conditioner for varying its temperature between the first temperature and the second temperature.

DETAILED DESCRIPTION OF THE PREFERRED EMBODIMENTS

Figure 1:
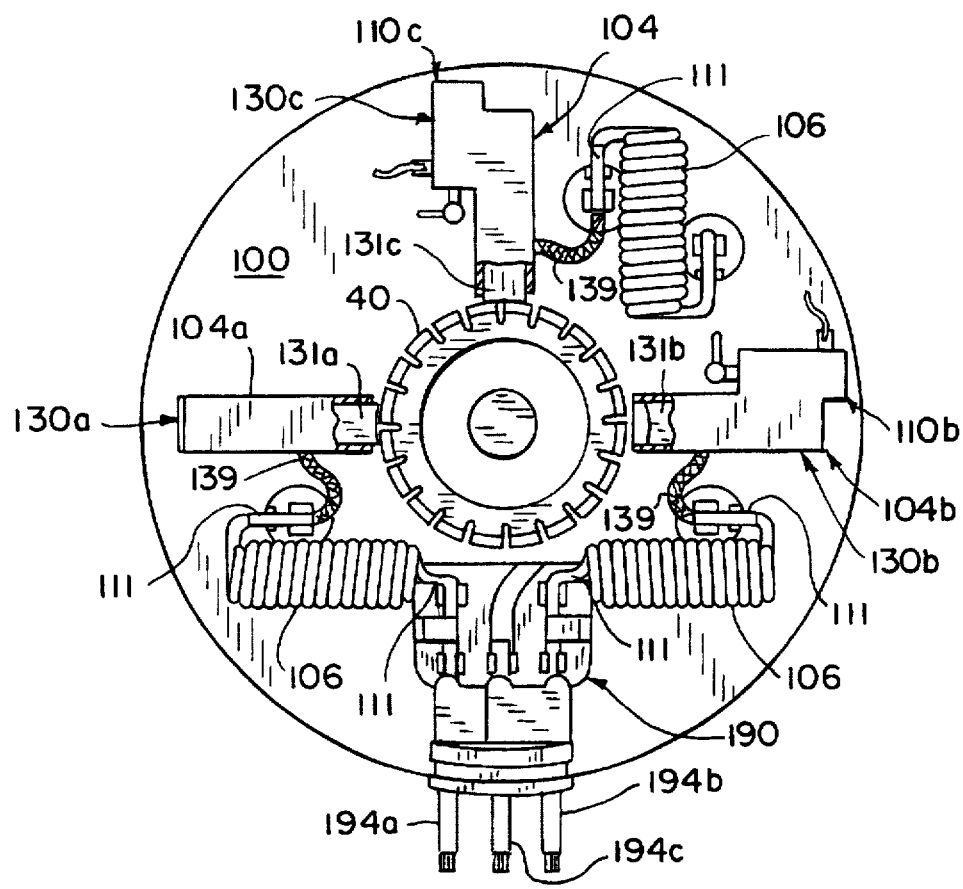
FIG. 1 is a cross-sectional view of a brush card and a commutator wheel for a two-speed direct current motor.

Referring to FIG. 1, a cross-section of a portion of a two-speed direct current (DC) motor is shown. In any preferred embodiment, the motor includes a stator and a rotor, the rotor being adapted for rotation with respect to the stator about an axial motor shaft. According to the preferred embodiment, the rotor includes a commutator (e.g. wheel 40) through which electrical connection is made to energize the armature wire windings that create the magnetic field to operate the motor; mounted within the stator is a brush card 100. As can be seen in FIG. 1, commutator wheel 40 is generally cylindrical-shaped and extends through an axial aperture in the center of substantially circular brush card 100.

Brush card 100 includes a negative brush assembly 130a, a low-speed positive brush assembly 130b and a high-speed positive brush assembly 130c. As shown in the FIGS., each brush assembly 130 includes a brush system with a brush 131, a brush carrier 104, a link 170 mechanically connecting brush 131 to its respective brush carrier 104 within a unit box 110. Each brush assembly 130 also includes a choke coil 106 and a busbar 111 providing electrical connection between brush 131 and a terminal of a connector 190. Connector 190 has three leads connected to the brush system: a negative lead 194a, a low-speed lead 194b and a high-speed lead 194c. Negative lead 194a is coupled to an electrical ground 10; low-speed lead 194b or high-speed lead 194c are selectively and alteratively coupled to a voltage source 20 by virtue of a switch 196 (shown schematically in FIG. 2). According to a preferred embodiment, for the automotive industry, voltage source 20 provides 12 volts of direct current; switch 196 is an electromagnetic relay.

Negative brush assembly 130a includes a negative brush 131a along with a brush carrier 104a; high-speed brush assembly 130c includes a high-speed brush 131c along with a brush carrier 104c and unit box 110c; low-speed brush assembly 130b includes a low-speed brush 131b along with a brush carrier 104b and unit box 110b. Each brush 131 is adapted for electrical contact with rotating commutator wheel 40 in order to energize a corresponding lead for the armature wire winding.

Figure 2:
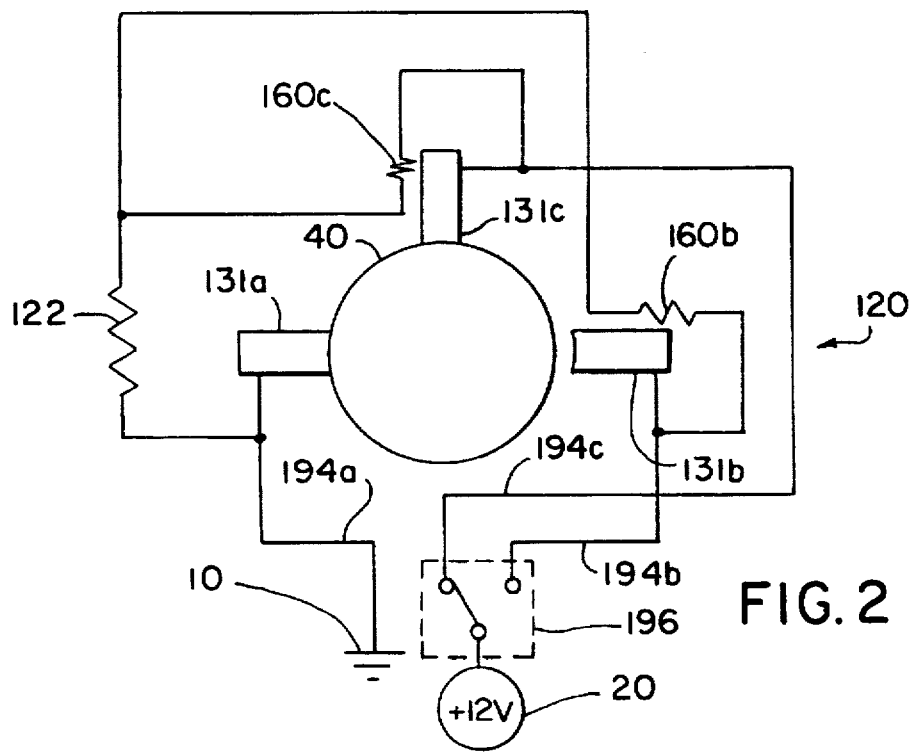
FIG. 2 is an electric schematic diagram of a brush system on the brush card.

FIG. 2 is an electrical schematic of the brush system circuit 120 showing negative brush 131a, high-speed brush 131c and low-speed brush 131b along with switch 196. Also shown schematically are electrical ground 10 and voltage source 20 (e.g., a 12 volt direct current supply). Brush system circuit 120 includes a low-speed shape memory alloy (SMA) element 160b for the low-speed brush assembly and a high-speed shape memory alloy (SMA) element 160c for the high-speed brush assembly. As indicated in FIG. 3 through 6, typical SMA element 160 (shown individually by reference numerals 160b or 160c in FIGS. 1 and 2), operates as a switch for a typical corresponding brush 131.

As shown, either low-speed brush 131b or high-speed brush 131c is energized depending upon the position of switch 196. When the motor is switched for operation at a low speed, low-speed SMA element 160b is also energized (receiving a current supplied to electrical ground 10 through a resistor 122). Low-speed brush 131b is urged into contact with the surface of commutator wheel 40, also receiving a current supplied to electrical ground 10 through negative brush 131a. (The value of resistor 122 may be selected to control the flow of current through either SMA element 160 to the desired level.) High-speed SMA element 160c is not energized and high-speed brush 131c is retracted from contact with the surface of commutator wheel 40.

When the motor is switched for operation at a high speed, high-speed SMA element 160c is also energized (receiving a current supplied to electrical ground 10 through a resistor 122). High-speed brush 131c is urged into contact with the surface of commutator wheel 40, also receiving a current supplied to electrical ground 10 through negative brush 131a. Low-speed SMA element 160b is not energized and low-speed brush 131b is retracted from contact with the surface of commutator wheel 40. (As shown in FIGS. 1 and 2, high-speed SMA element 160c is energized and high-speed brush 131c is urged into contact with commutator wheel 40.)

Figure 3:
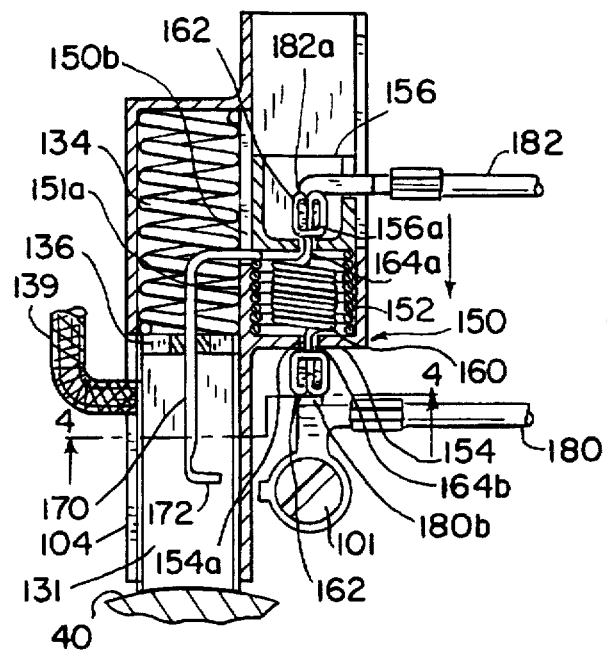
FIG. 3 is a close-up view of a brush assembly with a shape memory alloy element (switch) wherein a brush is in a fully-extended state (in contact with the commutator wheel)
Figure 5:
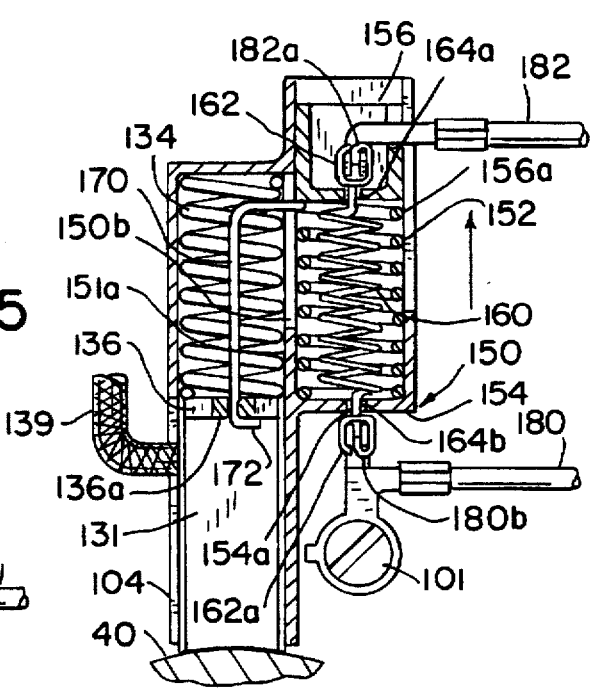
FIG. 5 is a close-up view of the brush assembly wherein the brush is in a transitional state.
Figure 6:
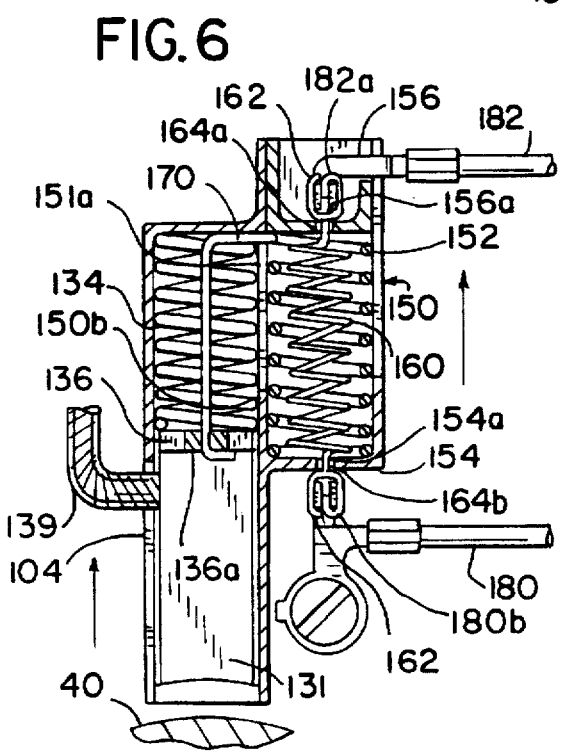
FIG. 6 is a close-up view of the brush assembly wherein the brush is in a retracted state (not in contact with the commutator wheel)

The typical arrangement of each positive brush assembly and the mechanism by which each SMA element controls the position of the corresponding brush is shown in FIGS. 3, 5 and 6. (Negative brush assembly 130 does not include a SMA element.) Brush assembly (130b or 130c) is housed in a unit box 110 having two chambers; the first chamber (brush carrier 104) is adjacent to the second chamber (SMA chamber 150). Each positive brush 131 is free to move in an axial direction within brush carrier 104, but constrained against movement in any other direction. A brush spring 134 is installed with brush carrier 104. A first end of brush spring 134 is positioned at the closed inside end of brush carrier 104 and a second end of brush spring 134 is positioned against a bracket 136. Bracket 136 positioned within brush carrier 104 between brush spring 134 and fixed to a first (inward) end of brush 131. The second (outward) end of brush 131 is free to extend through the open outside end of brush carrier 104 (which is maintained in close proximity to the surface of commutator wheel 40). Brush 131 includes a conductive portion for providing an electrical connection from the voltage source (through an appropriate lead to a corresponding busbar 111 and to a shunt 139 coupled between busbar 111 and the conductive portion of brush 131) to a conductive portion of the surface of commutator wheel 40. For operation of the motor, this electrical connection is established when brush 131 urged into physical (i.e. frictional) contact with rotating commutator wheel 40.

A two-speed motor may be configured with two brushes, only one of which is electrically active and in use at a given time. However in a conventional two-speed motor, both brushes remain in physical contact with the commutator wheel. As shown in the FIGS., the motor employing the brush system with SMA elements retracts the brush that is not in use from the surface of the commutator wheel. As shown in FIG. 2, high-speed brush assembly 130c has SMA element 160c; low-speed brush assembly 130b has SMA element 160b. (Negative brush assembly 130 does not include any SMA element.)

As shown in FIGS. 3 through 6, generally coil-shaped SMA element 160 (which functions in this arrangement as an SMA switch) is installed within a coil-shaped bispring 152 between a closed bottom end 154 of SMA chamber 150 (part of unit box 110) and sliding gate 156, which is configured for slidable movement within SMA chamber 150. (The positioning of SMA element 160 within bispring 152 is shown in phantom lines in FIG. 4.) SMA element 160 has a first end 164a and a second end 164b. First end 164a extends through an aperture 156a in gate 156; second end 164b extends through an aperture 154a in bottom end 154 in SMA chamber 150.

First end 164a and second end 164b of SMA element 160 each have a securing hook 162. Securing hook 162 of first end 164a is fastened to a corresponding securing clip 182a of positive busbar 182 (i.e. busbar providing electrical connection from SMA element 160 to the voltage supply); securing hook 162 of second end 164b is fastened to a corresponding securing clip 180a of negative busbar 180 (i.e. stationary busbar providing electrical connection from SMA element 160 to the electrical ground). The interface of securing clips 180a and 180b and securing hooks 162a and 162b, respectively, provides a locking arrangement that secures SMA element 160 to its respective busbar (180 or 182) regardless of whether the interface is under tension or compression° Negative busbar 180 is fastened to brush card 100 by a screw 101 (or rivet or other like fastener or fastening arrangement). Positive busbar 182 projects through a slot 150c in the wall of SMA chamber 150.

Figure 4:
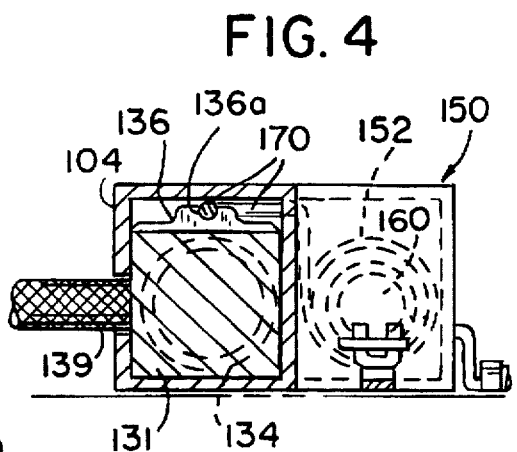
FIG. 4 is an end view of the brush assembly.
Figure 7:
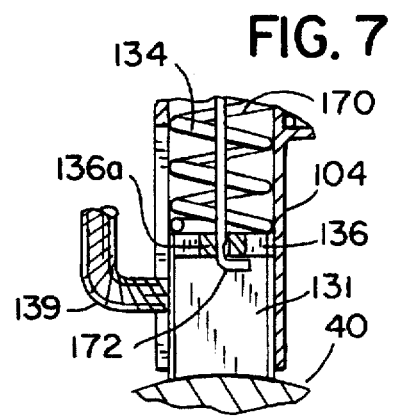
FIG. 7 is a close-up and cut-away view of the brush assembly wherein the brush has worn to the very last stages of its useful life.

Bispring 152 includes an integral link 170 which extends through a slot 150b in the shared wall 151a of SMA chamber 150 and brush carrier 104. Link 170 of bispring 152 is positioned along brush spring 134 (as shown in FIG. 4) and is retained in a clip 136a formed in bracket 136. A hook 172 is formed at the end of link 170 of bispring 152. As shown in FIG. 3, clip 136a of bracket 136 is at times free to travel along the straight portion of link 170 as bracket 136 travels (i.e. slides) within brush carrier 104 under the force of brush spring 134. However, as shown in FIGS. 5 through 7, hook 172 of link 170 is adapted to engage and lifts bracket 136, compressing brush spring 134 and lifting (i.e. retracting) brush 131 (attached to bracket 136) into brush carrier 104. Accordingly, in any preferred embodiment, the force provided by bispring 152 must be sufficient to overcome the force provided by brush spring 134 in a static condition.

It is known that objects made of certain shape memory alloys will tend to develop the intercrystal forces necessary to restore themselves to an reference shape when returned to a reference temperature. SMA element 160 (which itself resembles a coil spring) is fabricated with a contracted (or shrunken) reference shape as shown in FIG. 3. At ambient temperature conditions, SMA element 160 may be stretched by the restoration force of bispring 152. This is referred as to the recovery stage of the SMA element. (In alternative embodiments, bispring 152 may be eliminated when SMA element 160 can be rapidly cooled from its reference temperature or by teaching SMA element 160 to come to its first shape.)

In FIG. 3, the SMA element 160 is shown as energized. Current travels through the SMA element 160 to resistor 122 and back to electrical ground 10 completing an electrical circuit (see FIG. 2). As it is energized, SMA element 160 is electrically heated (from internal resistance) to its transformation (i.e., reference) temperature; while previously stretched SMA element 160 contracts if overcomes the restoration force of retaining bispring 152 and thus compresses bispring 152. Brush 131 (through bracket 136) is released (i.e. freed) from bispring hook 172 and pressed against the surface of commutator wheel 40 by the force of brush spring 134. At this point the armature winding of the motor is energized (i.e. current can flow from brush 131 to commutator 40) and current travels through the armature winding to negative brush 131a and back to electrical ground 10.

This arrangement is effected alternatively for the high-speed operation, where high-speed SMA element 160c is energized, or for low-speed operation, where low-speed SMA element 160b is energized. The principle of operation is the same for either of the SMA elements. (As shown in FIG. 2, resistor 122 is employed to reduce the current in SMA element 160 to a desired level, which in turn heats SMA element to a reference temperature.)

SMA element 160 attains an extended state at a first (or ambient) temperature (under the force of bispring 152) and a contracted state at a second (or reference) temperature above the first temperature (under its own intermolecular forces). In attaining the extended state and contracted state alternatively, switching of brush 131 is effected alternately between an engaged state (where link 170 is engaged to bracket 136) and a disengaged (or retracted) state (where link 170 is disengaged from bracket 136). The temperature conditioner for varying a temperature at SMA element 160 between the first temperature and the second temperature in this embodiment is the internal electrical resistance of SMA element 160.

Shape-memory alloys of various kinds are known in the art and are commercially available. According to the preferred embodiment, at a first temperature, which is expediently equal to a normal ambient (or environmental) temperature in a preferred embodiment, the SMA element 160 acts resiliently, almost like a simple mechanical spring element. At a second temperature, which expediently has a value substantially above the first temperature in a preferred embodiment, SMA element 160 develops a sufficiently high internal strain to returns (i.e. contract) to an original or reference shape (i.e. a shape it had before being extended at the first temperature) notwithstanding other forces it must overcome (e.g. bispring 152). On return to the first temperature, the SMA element 160 reattains its resiliency and is again extended. According to a preferred embodiment, a limit temperature, defining a limit where a phase transition between the extended state and the contracted state occurs within the shape memory alloy and being a specific parameter of the shape memory alloy, is established at least slightly greater than any temperature which may be expected as an environmental temperature for the motor.

According to a particularly preferred embodiment, NiTi is used as the shape memory alloy for the wire of SMA element 160; bispring 152 and brush spring 134 are of a standard steel construction. SMA element 160 needs approximately 0.10 volts to be properly energized (i.e. to effect its temperature conditioner). In any preferred embodiment, in order to operate properly, the SMA element must be able to overcome the force of the bispring; the bispring must be able to overcome the force of the brush spring. The combination of number of coils and diameter must be suitable for this purpose. In a particularly preferred embodiment, the bispring should include at least three working coils (to lift the brush sufficiently).

Returning now to FIG. 3, the operation of brush assembly 130 can be described. SMA element 160 is energized and has contracted, pulling gate 156 toward the bottom of SMA chamber 150 and compressing bispring 152. integral link 170 of bispring 152 has been displaced so that hook 172 has disengaged bracket 136. As a result, brush spring 134 is free and urges brush 131 into contact with the surface of commutator wheel 40. In FIG. 5, SMA element 160 is in a transitional state (between being fully energized and being de-energized), and no longer has the force to compress bispring 152. Bispring 152 therefore displaces integral link 170 so that hook 172 engages bracket 136. Bracket 136 is retained by hook 172 against the force of brush spring 134; brush 131 is in under the incipient control of bispring 152, but remains in contact with the surface of commutator wheel 40. In FIG. 6, SMA element 160 is fully de-energized and fully extended by the force of bispring 152. Bispring 152 is fully extended and has fully displaced integral link 170. Link 170 retains bracket 136 and has fully compressed brush spring 134. Brush 131 is fully retracted from the surface of commutator wheel 40. Referring to FIG. 7, brush 131 is shown in the very last stages of its useful life, having been worn (by contact with the surface of commutator wheel 40) down to a fraction of its original length (compare FIG. 3). While SMA element 160 remains operative, further wear would result in brush spring 134 forcing bracket 136 into hook 172 of link 15, and this is the full extension of brush spring 134.

As explained, in a preferred embodiment, the brush system will be operated in an ambient environment having an ambient temperature equalling the first temperature. According to an alternative embodiment, a temperature conditioner is included, which has a heating installation. According to a particularly preferred embodiment, the heating installation is an electric network connected to the SMA element for passing an electric current therethrough to electrically heat the SMA element (see FIG. 2). In effect, the SMA element is employed as its own electric heater (without the need for further components and accompanying further expenditures). This type of temperature conditioner is shown in the embodiment of FIGS. 1–7. In alternative embodiments, other known arrangements for temperature conditioning (i.e. heating or cooling) the SMA element can be used.

ADDITIONAL ALTERNATIVE EMBODIMENTS

According to another embodiment (not shown), the SMA element (or switch) is mechanically coupled to a switch spring, whereby the SMA element stresses the switch spring as attaining the contracted (shrunken) state and the switch is extended by the switch spring when attaining the extended state. According to a further embodiment (not shown), the switch is a rod coiled around an axis and has a variable length along the axis equalling a first length in the contracted (shrunken) state and a second length in the extended state. (Such a switch is particularly preferred in combination with the switch spring just described.) In a further preferred embodiment, the switch spring is a helical spring aligned along the axis and having ends being fastened to respective ends of the switch. It is particularly preferred that the switch spring surrounds the switch, creating an especially compact part of the brush system. In combination with a switch spring as described, the switch is extended to its extended state at the first temperature by action of the switch spring; as the switch attains its retracted (shrunken) state at the second temperature, it stresses, in particular compresses the switch spring and thus loads it with sufficient energy to extend the switch again as its temperature falls back to the first temperature.

According to another embodiment of the invention, the link comprises a link spring mechanically coupling brush to the brush carrier. In normal operation the link spring, resting on the brush carrier, will press the brush onto the rotating commutator wheel. It is preferred to have the SMA element acting upon the brush against a force exerted by the link spring as the SMA element is in the disengaged state, and to have the SMA element disengaged from the brush (and brush freely acted upon by the link spring) in the engaged state. In this context, it is further preferred to have the SMA element acting upon the brush by attaining its contracted (shrunken) state, still more preferred to clamp the brush with a hook member fastened to the SMA element.

According to a further embodiment, the brush belongs to a plurality of mutually similar brushes° The brushes of that plurality can selectively be engaged of disengaged by appropriately setting the respective switches of the brushes. In operation, a selected single brush can thus be contacted with the commutator wheel when in the engaged state, and each other brushes of the plurality can be retracted from the commutator wheel by setting it (or them) into its (or their) disengaged state. (In a preferred embodiment, all brushes of the plurality are carried on a single brush carrier.) It is further preferred for the embodiment just specified that each brush have a respective temperature conditioner (e.g. heating or cooling element as necessary for the SMA element). The respective temperature conditioner may include an electric heating system having two connection ports, whereof a first port is electrically connected to one brush and a second port is electrically connected to a second brush. Electric power is supplied to the heating installation concurrently with electric power being fed to the brush selected for operation; in this way, alteration of the state of the switch, and thereby of the state of the brush, is directly effected in a particularly simple and expedient manner. Each of the brushes is electrically connected to a respective switching port of a multiple switch for selectively connecting each of the brushes to a single common port of the multiple switch, and this common part and the additional brush are electrically connected to respective terminals of an electric power supply (e.g. voltage source). The brush system just described is preferably set up to operate by having a selected brush of said brushes connected to the common port of the multiple SMA switch (e.g. SMA element) via its respective switching port, having the selected brush in its engaged state by the SMA switch connected to its link in its retracted state and having each other brush in its disengaged state by the SMA switch connected to its link in its shrunk state and having each other brush in its disengaged state by the switch connected to its respective link in the extended state. These combinations of states for the brushes and their switches are particularly suitable if the switches are made of the particular type of shape memory alloy specified above (i.e. if each of those switches prevails in its extended state at a fairly low first temperature, preferably a normal ambient temperature, and is to be made attain its shrunk state by heating to a second temperature substantially above the first temperature). The heating is expediently done electrically, for example by passing an electric current through the SMA switch itself, and is thus most favorably combined with feeding electric power to the brush upon selection for operation.

According to an additional embodiment of the invention, the brush system comprises an additional brush and an additional link mechanically connecting the additional brush to the brush carrier, where the additional link has no SMA switch connected thereto. Thus, the additional brush will always be engaged and thereby, in operation, always be contacted to the commutator wheel. The additional brush can serve as a common port to electrically access a rotor winding connected to the commutator wheel while each brush of the plurality of brushes serves as another port to electronically access the rotor winding for operating the rotor winding in a particular way.

According to another embodiment of the invention, the brush system includes a plurality of brushes as well as an additional brush has the brush carrier installed at a commutator wheel of an electric machine, and has the additional brush as well as one brush electrically connected to the commutator wheel as well as each brush from the plurality other than the selected brush distant from the commutator wheel. The electric machine thus equipped and operated features operation at several rotational speeds without increased brush wear and noise production at a particularly small additional expense, as compared to prior art electric machines of that type.

In accordance with further embodiments of the invention, all further embodiments of the inventive brush system as disclosed herein are contemplated for the inventive electric machine. Particularly, the brush in the inventive machine may belong to a plurality of mutually similar brushes, preferably fastened on a single brush carrier; also, the electric machine may incorporate an additional brush and an additional link connecting the additional brush to the brush carrier, whereby the additional link has no switch connected thereto.

Although the invention has been described as embodied in a brush system for providing an electric connection to a rotating commutator wheel of an electric machine and an electric machine incorporating such a brush system, it is not intended to be limited to the details shown, but shall encompass all further developments and modifications thereof as understood by those of ordinary skill in the art and as set forth in the appended claims.

What is claimed is:

1. An apparatus for providing an electric connection between a voltage source and a rotating commutator wheel of an electric machine, comprising:

a fixed brush in electrical connection with the commutator wheel;

a first switched brush system;

a second switched brush system;

a voltage switch configured to provide electrical connection selectively between the voltage source and the first switched brush system or the second switched brush system;

wherein the first switched brush system and the second switched brush system each include;

a switched brush switchable between a disengaged position and an engaged position in electrical connection with the commutator wheel; and a brush switch having a shape memory alloy element adapted to switch the switched brush between the disengaged position and the engaged position;

so that the electrical machine operates at a first speed when the switched brush of the first switched brush system is in electrical connection with the voltage source and at a second speed when the switched brush of the second switched brush system is in electrical connection with the voltage source;

wherein the shape memory alloy element is configured to attain a retracted shape when at a transition temperature and an extended shape at an ambient temperature below the transition temperature, so that the switched brush is switched from the disengaged position into the engaged position when the shape memory alloy element takes the retracted shape.

2. The apparatus of claim 1 wherein the brush switch further comprises a temperature conditioner for varying the temperature of the shape memory alloy element between the ambient temperature and the transition temperature.

3. The apparatus of claim 2 wherein the temperature conditioner comprises an internal electrical resistance of the shape memory alloy element.

4. The apparatus of claim 1 wherein the brush switch is selectively coupled to the voltage source through the voltage switch so that the switched brush is switched into the engaged position when a current is supplied to the brush switch.

5. The apparatus of claim 1 wherein the first switched brush system and the second switched brush system each further comprise:

a brush carrier within which the switched brush is contained for movement between the engaged position and the disengaged position, and a brush spring contained within the brush carrier to provide an engagement force tending to maintain the switched brush in the engaged position.

6. The apparatus of claim 5 wherein the brush switch is configured to switch the switched brush from the engaged position to the disengaged position by providing a disengagement force to the switched brush, the disengagement force being sufficient to overcome the engagement force provided by the brush spring.

7. The apparatus of claim 6 wherein the brush switch further comprises a bispring coacting with the shape memory alloy element so that the bispring provides the disengagement force to the switched brush when the shape memory alloy element is in the extended shape and the brush spring provides the engagement force to the switched brush when the shape memory alloy element takes the retracted shape.

8. The apparatus of claim 7 wherein the shape memory alloy element comprises a helical coil having a compressed condition when the shape memory alloy element is in the retracted shape and an extended condition when the shape memory alloy element is in the extended shape.

9. The apparatus of claim 8 wherein the shape memory alloy element is configured to provide a compressive force greater than an opposing force of the bispring so that the shape memory alloy element when in the compressed condition retracts the bispring.

10. The apparatus of claim 9 wherein the shape memory alloy element is a helical coil having a central axis and the bispring is a helical coil spring having an axis in substantial alignment with the central axis of the shape memory alloy element so that the shape memory alloy element provides a compressive force along the central axis and the bispring provides an opposing force substantially along the central axis.

11. The apparatus of claim 10 wherein the shape memory alloy element has a first end and a second end and the bispring has a first end and a second end so that the first end of the shape memory alloy element is coupled to the first end of the bispring and the second end of the shape memory alloy element is coupled to the second end of the bispring.

12. The apparatus of claim 5 wherein the brush spring is a helical coil spring.

13. The apparatus of claim 12 wherein the brush switch further comprises a hook member in selective engagement with the brush spring.

14. An apparatus for providing an electric connection between a voltage source and a rotating commutator wheel of an electric machine, comprising:

a fixed brush in electrical connection with the commutator wheel;

a first switched brush system;

a second switched brsh system;

a voltage switch for selectively providing electrical connection between the voltage source and the first switched brush system or the second switched brush system;

wherein the first switched brush system and the second switched brush system each include;

a switchable brush, switchable between a disengaged position and an engaged position in electrical connection with the commutator wheel, and a brush switch having a shape memory alloy element adapted to switch the switched brush between the engaged position when the shape memory alloy element is in a retracted shape and the disengaged position when the shape memory alloy element is in an extended shape; and a temperature condition in electrical connection with the brush switch so that the shape memory alloy element can be elevated to a transition temperature at which the shape memory alloy element takes the retracted shape when an electrical current is supplied to the brush switch.

15. The apparatus of claim 14 wherein the shape memory alloy element comprises a helical coil having a compressed condition when the shape memory alloy element is in the retracted shape and an extended condition when the shape memory alloy element is in the extended shape.

16. The apparatus of claim 15 wherein the temperature conditioner is configured to vary a temperature of the shape memory alloy element between the transition temperature and an ambient temperature.

17. The apparatus of claim 16 wherein each of the temperature conditioner comprises the electrical resistance inherent in the shape memory alloy element so that the transition temperature is attained when the electrical current is provided to the brush switch.

18. The apparatus of claim 14 wherein the first switched brush system and the second switched brush system each further comprise:
- a brush carrier within which the switched brush may move from the engaged position to the disengaged position, and
- a brush spring within the brush carrier to provide an engagement force tending to maintain the switched brush in the engaged position,
- and wherein the brush switch is configured to switch the switched brush from the engaged position to the disengaged position by providing a disengagement force to the switched brush, the disengagement force being sufficient to overcome the engagement force provided by the brush spring,
- the brush switch further comprising a bispring coacting with the shape memory alloy element so that the bispring provides the disengagement force to the switched brush when the memory shape alloy element is in the extended shape and the brush spring provides the engagement force to the switched brush when the shape memory alloy element takes the retracted shape, and;
- the shape memory alloy element comprising a helical coil having a compressed condition when the shape memory alloy element is in the retracted shape and an extended condition when the shape memory alloy element is in the extended shape.

19. A two-speed electric machine energized by a voltage source, comprising:
- a rotating commutator wheel;
- a fixed brush in electrical connection with the commutator wheel;
- a first switched brush system;
- a second switched brush system;
- a voltage switch for providing selective electrical connection between the voltage source and either the first switched brush system or the second switched brush system;
- wherein the first switched brush system and the second switched brush system each include
  - a switched brush, switchable between a disengaged position and an engaged position in electrical connection with the commutator wheel;
  - a brush switch having a shape memory alloy element adapted to switch the switched brush between the disengaged position and the engaged position;
  - a housing, mounted adjacent to the commutator wheel, having a first compartment containing the switched brush and a second compartment containing the brush switch;
  - a brush spring, disposed within the first compartment of the housing, providing an engagement force intended to maintain the switched brush in the engaged position;
  - a bispring, disposed within the second compartment of the housing, coacting with the shape memory alloy element so that the bispring provides a disengagement force to the switched brush when the shape memory alloy element is in an extended position and the brush spring provides the engagement force to the switched brush when the shape memory alloy element is in a retracted position;
  - so that the electrical machine operates at a first speed when the switched brush of the first switched brush system is in electrical connection with the voltage source and at a second speed when the switched brush of the second switched brush system is in electrical connection with the voltage source.

20. The electric machine of claim 18 wherein the brush switch further comprises a temperature conditioner which is energized when the brush switch is in electrical connection with the voltage source so that the shape memory alloy element is elevated to a transition temperature at which the shape memory alloy element takes a retracted shape.

21. The electric machine of claim 20 wherein the brush spring is a helical coil spring.

22. The electric machine of claim 20 wherein the temperature conditioner is an internal electrical resistance of the shape memory alloy element.

23. The electric machine claim 22 wherein the shape memory alloy element comprises a helical coil having a compressed condition when the shape memory alloy element is in the retracted shape and an extended condition when the shape memory alloy element is in the extended shape to provide a compressive force greater than an opposing force of the bispring so that the shape memory alloy element when in the compressed condition retracts the bispring.

24. The electric machine of claim 22 wherein the shape memory alloy element is a helical coil having a central axis and the bispring is a helical coil spring having an axis in substantial alignment with the central axis of the shape memory alloy element so that the shape memory alloy element provides a compressive force along the central axis and the bispring provides an opposing force substantially along the central axis.

25. The electric machine of claim 22 wherein the shape memory alloy element has a first end and a second end and the bispring has a first end and a second end so that the first end of the shape memory alloy element is coupled to the first end of the bispring and the second end of the shape memory alloy element is coupled to the second end of the bispring.

* * * * *